(12) United States Patent
Nishifukumoto

(10) Patent No.: US 10,439,460 B2
(45) Date of Patent: Oct. 8, 2019

(54) ROTOR OF ELECTRIC MOTOR AND ITS MANUFACTURING METHOD

(71) Applicant: FANUC CORPORATION, Yamanashi (JP)

(72) Inventor: Akira Nishifukumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/405,471

(22) Filed: Jan. 13, 2017

(65) Prior Publication Data

US 2017/0214282 A1 Jul. 27, 2017

(30) Foreign Application Priority Data

Jan. 21, 2016 (JP) .................................. 2016-009987

(51) Int. Cl.
| | |
|---|---|
| *H02K 15/03* | (2006.01) |
| *H02K 15/12* | (2006.01) |
| *H02K 1/28* | (2006.01) |
| *H02K 1/27* | (2006.01) |

(52) U.S. Cl.
CPC ............ *H02K 1/28* (2013.01); *H02K 1/278* (2013.01); *H02K 15/03* (2013.01); *H02K 15/12* (2013.01)

(58) Field of Classification Search
CPC ........... H02K 1/04; H02K 1/278; H02K 1/28; H02K 15/03; H02K 15/02
USPC .................. 310/156.08, 156.12; 29/598, 607
IPC ................................................. H02K 1/27,1/28
See application file for complete search history.

(56) References Cited

U.S. PATENT DOCUMENTS

| | | | |
|---|---|---|---|
| 2007/0145849 A1* | 6/2007 | Okamoto | H02K 1/276 310/156.53 |
| 2012/0187792 A1* | 7/2012 | Maruyama | H02K 1/278 310/156.28 |
| 2013/0214620 A1* | 8/2013 | Kobayashi | H02K 1/278 310/43 |
| 2014/0239749 A1 | 8/2014 | Fehn | |
| 2015/0061444 A1* | 3/2015 | Kamiya | H02K 1/278 310/156.12 |

(Continued)

FOREIGN PATENT DOCUMENTS

| | | |
|---|---|---|
| JP | 2005117732 A | 4/2005 |
| JP | 2009194984 A | 8/2009 |

(Continued)

OTHER PUBLICATIONS

"Toward, adj. and adv." OED Online. Oxford University Press, Jun. 2017. Web. Jan. 11, 2018.*

(Continued)

*Primary Examiner* — Thomas Truong
(74) *Attorney, Agent, or Firm* — Fredrikson & Byron, P.A.

(57) ABSTRACT

A rotor capable of preventing a cover tube from being deformed locally due to injection pressure of a resin injected into a gap between a rotor core and a cover tube. The rotor includes a rotor core, a plurality of magnets, a cover tube, and a filler which is filled into the gap between the rotor core, and the cover tube. The rotor core includes a plurality of projections which project radially outward from an outer circumferential face of the rotor core, and which extends toward a second end face of the rotor core from a first end face of the rotor core in an axial direction of the rotor core, and a cutout that is dented radially inward from a radially outside end face of at least one of the projections.

5 Claims, 11 Drawing Sheets

(56) References Cited

U.S. PATENT DOCUMENTS

2018/0062488 A1* 3/2018 Okudaira ............... H02K 15/03

FOREIGN PATENT DOCUMENTS

| JP | 2010206939 A | * | 9/2010 | | |
|---|---|---|---|---|---|
| JP | 201155687 A | | 3/2011 | | |
| JP | 201244789 A | | 3/2012 | | |
| JP | 2012157143 A | | 8/2012 | | |
| JP | 2013169103 A | | 8/2013 | | |
| JP | WO 2016147211 A1 | * | 9/2016 | ............... | H02K 1/27 |

OTHER PUBLICATIONS

Machine Translation, OCHIAI, JP 2010206939 A, Sep. 2010.*
English Abstract and Machine Translation for Japanese Publication No. 2013-169103 A, published Aug. 29, 2013, 16 pgs.
English Abstract and Machine Translation for Japanese Publication No. 2012-157143 A, published Aug. 16, 2012, 10 pgs.
English Abstract and Machine Translation for Japanese Publication No. 2012-044789 A, published Mar. 1, 2012, 8 pgs.
English Abstract and Machine Translation for Japanese Publication No. 2011-055687 A, published Mar. 17, 2011, 13 pgs.
English Abstract and Machine Translation for Japanese Publication No. 2010-206939 A, published Sep. 16, 2010, 16 pgs.
English Abstract and Machine Translation for Japanese Publication No. 2009-194984 A, published Aug. 27, 2009, 17 pgs.
English Abstract and Machine Translation for Japanese Publication No. 2005-117732 A, published Apr. 28, 2005, 10 pgs.

* cited by examiner

US 10,439,460 B2

ROTOR OF ELECTRIC MOTOR AND ITS MANUFACTURING METHOD

BACKGROUND OF THE INVENTION

1. Field of the Invention

The invention relates to a rotor of an electric motor, and a method of manufacturing the rotor of the electric motor.

2. Description of the Related Art

Known rotors include a plurality of magnets that are arranged radially outside of the rotor core, a cylindrical cover tube that surrounds the plurality of magnets, and a resin which is filled into a gap between the cover tube and the rotor core (for example, Japanese Unexamined Patent Publication (Kokai) No. 2013-169103).

When the above rotors are manufactured, generally the resin is injected in a gap between a rotor core and a cover tube. Such a gap is narrow, and it is difficult to position a gate of the injection molding machine at the gap. In addition, a cover tube is sometimes deformed locally due to the injection pressure of the resin which is injected into the gap.

SUMMARY OF THE INVENTION

In an aspect of the invention, a rotor of an electric motor comprises a rotor core, a plurality of magnets arranged radially outside of the rotor core, a cover tube surrounding the plurality of magnets, and a filler filled in a gap between the rotor core and the cover tube.

The rotor core includes a plurality of projections projecting radially outside from an outer circumferential face of the rotor core, and the plurality of projections extending in an axial direction from a first end face of the rotor core in one direction of the axial direction toward a second end face of the rotor core in the other direction of the axial direction, and a cutout formed to be recessed radially inside from a radially outside end face of at least one of the projections.

The plurality of projections are arranged so as to align in a circumferential direction of the rotor core. Each magnet is arranged between two of the projections adjacent to each other in the circumferential direction.

The cutout extends from the first end face toward the second end face. The filler may be a resin. The cutout may extend from the first end face to the second end face.

In another aspect of the invention, a method of producing a rotor of an electric motor comprises providing a rotor core including a cutout formed to be recessed radially inside from an outer circumferential face of the rotor core, the cutout extending in an axial direction from a first end face of the rotor core in one direction of the axial direction toward a second end face of the rotor core in the other direction of the axial direction.

The method further comprises arranging a plurality of magnets at radially outside of the rotor core so that the cutout is located at a position between two of the magnets adjacent to each other in a circumferential direction of the rotor core, arranging a cover tube so as to surround the plurality of the magnets, and injecting a filler into the cutout and filling a gap between the rotor core and the cover tube with the filler.

BRIEF DESCRIPTION OF THE DRAWINGS

The above-mentioned and other objects, features and advantages of the invention will be clarified from the description of the following embodiments with reference to the accompanying drawings, in which.

DETAILED DESCRIPTION

Figure 1:
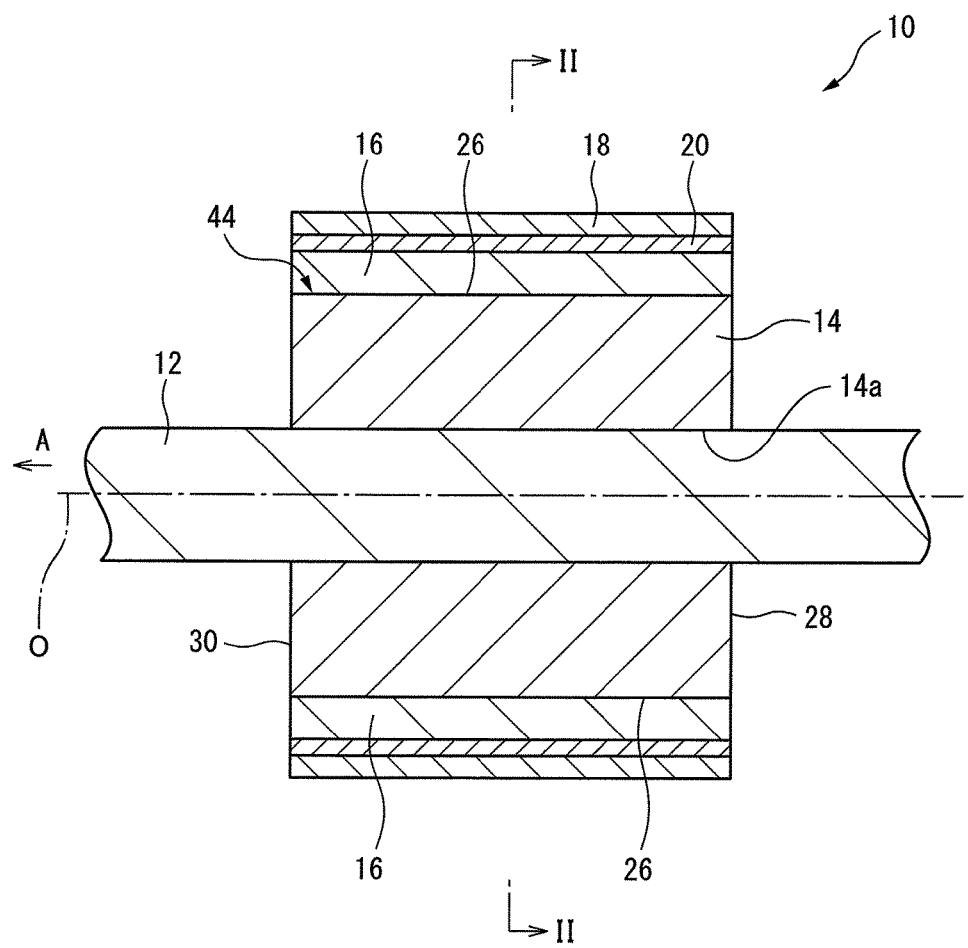
FIG. 1 is a cross-sectional side view of a rotor according to an embodiment.

Hereinafter, embodiments of the invention will be described in detail based on the drawings. First, a rotor 10 according to an embodiment will be described with reference to FIGS. 1-3. Note that, in the following description, an axial direction corresponds to a direction along a rotation axis O of a rotor, a radial direction corresponds to a direction of radius of a circle centered about the axis O, and the circumferential direction corresponds to a circumferential direction of the circle. Further, for convenience, the direction indicated by the arrow A in the figures is referred to as a frontward in the axial direction (or axially forward).

The rotor 10 is rotatably arranged at radially inside of a stator (not shown) of an electric motor, and constitutes the electric motor together with the stator. The rotor 10 includes a rotation shaft 12, a rotor core 14, a plurality of magnets 16, a cover tube 18, and a filler 20. The rotation shaft 12 is a columnar member extending in the axial direction.

The rotor core 14 is a cylindrical member fixedly arranged at radially outside of rotation shaft 12. The rotor core 14 is comprised of a plurality of magnetic steel sheets stacked in the axial direction, and is arranged so as to be centered about the axis O. The rotor core 14 is formed with a through hole 14a at its center, into which the rotation shaft 12 is inserted.

The rotor core 14 includes a plurality of projections 22, and a plurality of cutouts 24. Each of the projections 22 projects radially outward from an outer circumferential face 26 of the rotor core 14, and extends in the axial direction from a first end face 28 of the rotor core 14 in the axially rearward direction to a second end face 30 of the rotor core 14 in the axially frontward direction. In this embodiment, a total of eight projections 22 are formed so as to align in the circumferential direction at substantially equal intervals.

Figure 3:
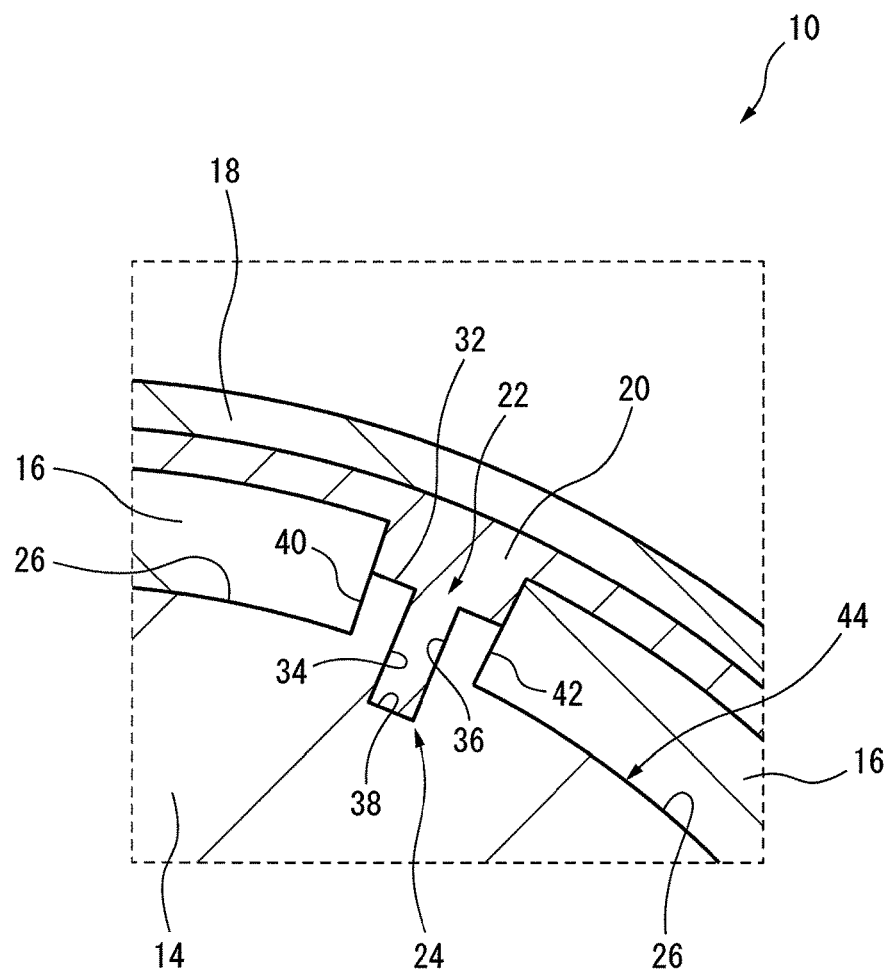
FIG. 3 is an enlarged view of section III in FIG. 2.

As shown in FIG. 3, each projection 22 has a pair of side faces 40 and 42 opposite to each other, and a radially outside end face 32. The side faces 40 and 42 are substantially planes extending radially outward from the outer circumferential face 26 and extending in the axial direction. The end face 32 extends between the side faces 40 and 42, and extends in the axial direction.

Each cutout 24 is formed at the rotor core 14 so as to be recessed radially inward from the radially outside end face 32 of the projection 22. As shown in FIG. 3, each cutout 24 is defined by a pair of side faces 34 and 36 facing each other, and a bottom face 38 extending between the side faces 34 and 36.

The side faces 34 and 36 are substantially planes disposed to be spaced away from each other in the circumferential direction by a predetermined distance, and extending in the axial direction so as to be substantially parallel to each other. The bottom face 38 is a substantially plane located radially inward from the outer circumferential face 26, and extending in the axial direction.

Thus, an outer circumferential face 44 of the rotor core 14 is defined by the outer circumferential face 26, the side faces 34, 36, 40 and 42, the bottom face 38, and the end face 32.

Each of the magnets 16 is an elongated magnetic member (e.g., neodymium or ferrite) extending in the axial direction, and is arranged between two of the projections 22 adjacent to each other in the circumferential direction, so as to be fixed on the outer circumferential face 26 of the rotor core 14. In this embodiment, a total of eight magnets 16 are arranged so as to align in the circumferential direction at substantially equal intervals.

The cover tube 18 is a tubular member which surrounds the plurality of magnets 16 from radially outside. The cover tube 18 is made of nonmagnetic materials, such as stainless steel, and is arranged so as to be centered about the axis O.

The filler 20 is filled in a gap between the rotor core 14 and the cover tube 18. More specifically, the filler 20 is filled in a gap between each magnet 16 and the cover tube 18, a gap between each projection 22 and the cover tube 18, and inside of each cutout 24. As an example, the filler 20 is a resin.

Figure 2:
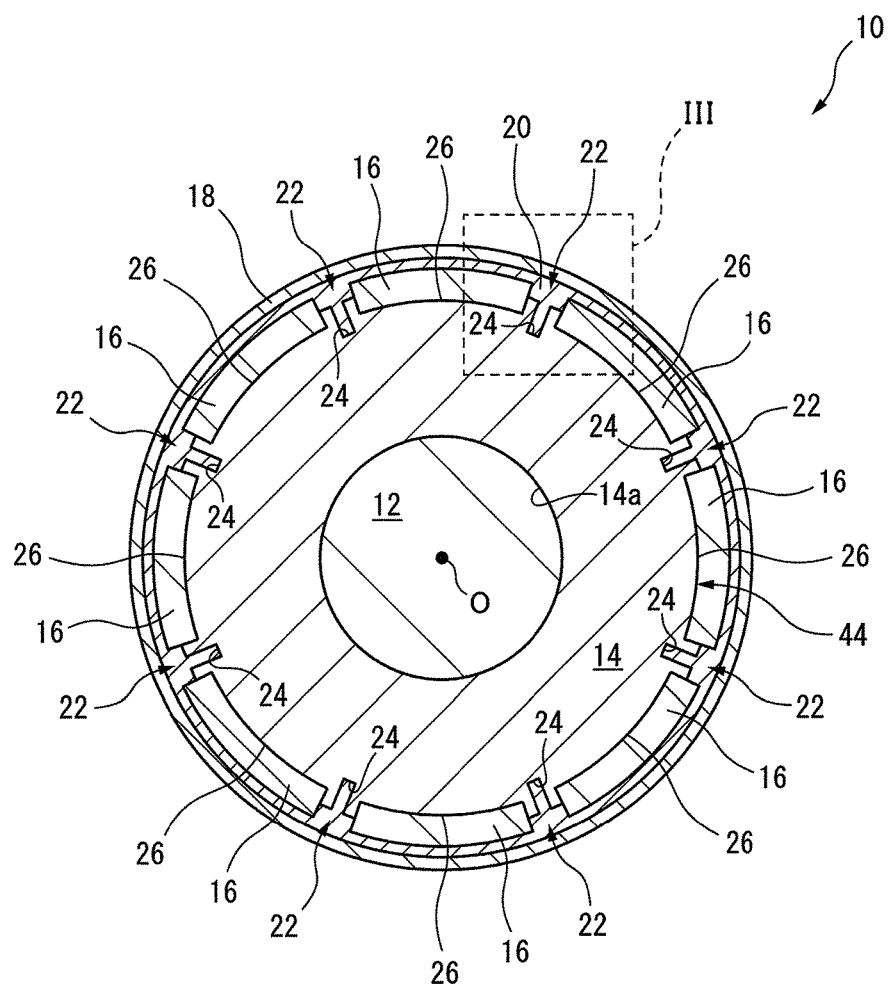
FIG. 2 is a cross-sectional view of the rotor shown in FIG. 1, when been cut along II-II in FIG. 1.

Next, a method of producing the rotor 10 will be described with reference to FIGS. 4-8. At step S1, a manufacturer manufactures the rotor core 14. Specifically, the manufacturer punches a plurality of electromagnetic steel plates by pressing, and stacks the punched electromagnetic steel plates in the axial direction, thereby the rotor core 14 shown in FIGS. 1 and 2 is manufactured.

At step S2, the manufacturer arranges the plurality of magnets 16 at radially outside of the rotor core 14 manufactured at step S1. Specifically, the manufacturer arranges each magnet 16 on a position between two of the projections 22 adjacent to each other in the circumferential, i.e., on the outer circumferential face 26 of the rotor core 14.

In this embodiment, since the projections 22 of the rotor core 14 can prevent a displacement of the magnets 16 in the circumferential direction, the manufacturer can easily position the magnets 16 on the outer circumferential face 26, without bonding the magnets 16 on the outer circumferential face 26 of the rotor core 14 by e.g. adhesive.

Figure 5:
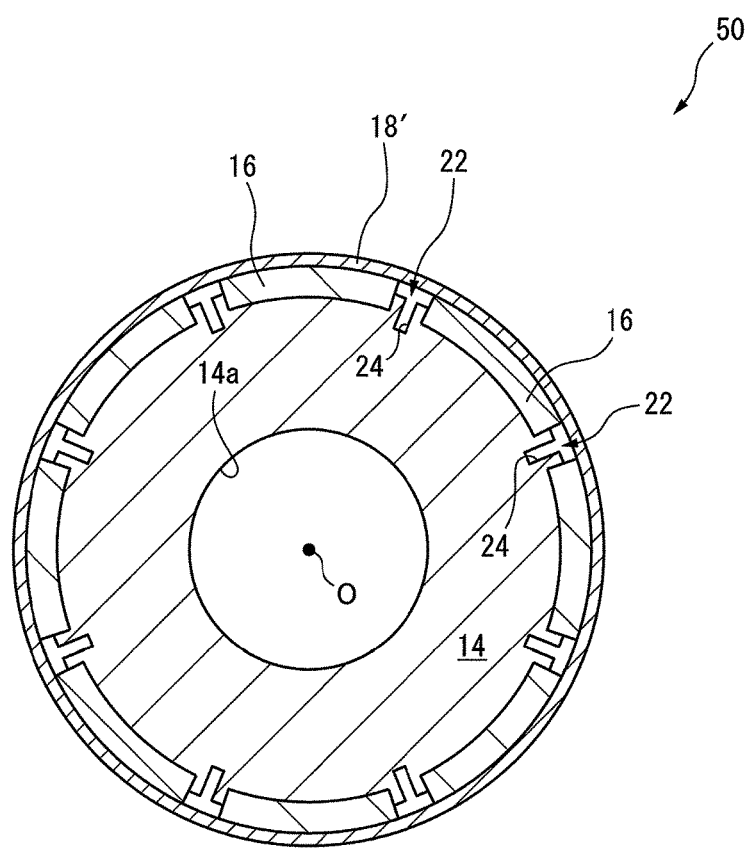
FIG. 5 is a view of an assembly produced at step S3 in FIG. 4.

At step S3, the manufacturer arranges a cover tube 18' so as to surround the plurality of magnets 16. Specifically, the manufacturer prepares the cover tube 18' (FIG. 5). The cover tube 18' is a cylindrical member which has a diameter smaller than that of the cover tube 18 shown in FIGS. 1 and 2, and an axial length the same as that of the cover tube 18.

Then, the manufacturer fits the cover tube 18' over the magnets 16 fixed on the outer circumferential face 26 of the rotor core 14, so as to surround the magnets 16 from radially outside. This state is shown in FIG. 5. By this step S3, an assembly 50 including the rotor core 14, the magnets 16, and the cover tube 18' is manufactured. In this assembly 50, the inner circumferential face of the cover tube 18' contacts the outer faces of the magnets 16.

At step S4, the manufacturer sets the assembly 50 manufactured at step S3 in a first mold 102 of an injection molding machine 100. Below, the injection molding machine 100 according to an embodiment will be described with reference to FIG. 6.

The injection molding machine 100 includes the first mold 102, a second mold 104, a filler supply unit 106, a spool 107, and a hot runner 108. The first mold 102 is formed with a circular cavity 110.

The second mold 104 is installed so as to be movable in directions toward and away from the first mold 102. The second mold 104 has a pressurizing face 104a which faces the first mold 102. The filler supply unit 106 supplies into the spool 107 the filler which is heated to be liquefied. The filler supplied into the spool 107 flows through the spool 107, and flows into the hot runner 108.

The hot runner 108 includes a heater (not shown), and feeds the filler flown from the spool 107 in a liquefied state. A plurality of gates 112 are formed at the exits of the hot runner 108.

Each gate 112 opens to the outside at the pressurizing face 104a of the first mold 104. The filler flown into the hot runner 108 flows through the hot runner 108 so as to be injected out from the gate 112.

The gates 112 are arranged so as to align in the circumferential direction at substantially equal intervals. The positions of these gates 112 respectively correspond to the positions of the cutouts 24 formed at the rotor core in the circumferential direction.

For example, the hot runner 108 is provided with a total of eight gates 112, the positions in the circumferential direction of which respectively correspond to those of a total of eight cutouts 24.

Figure 6:
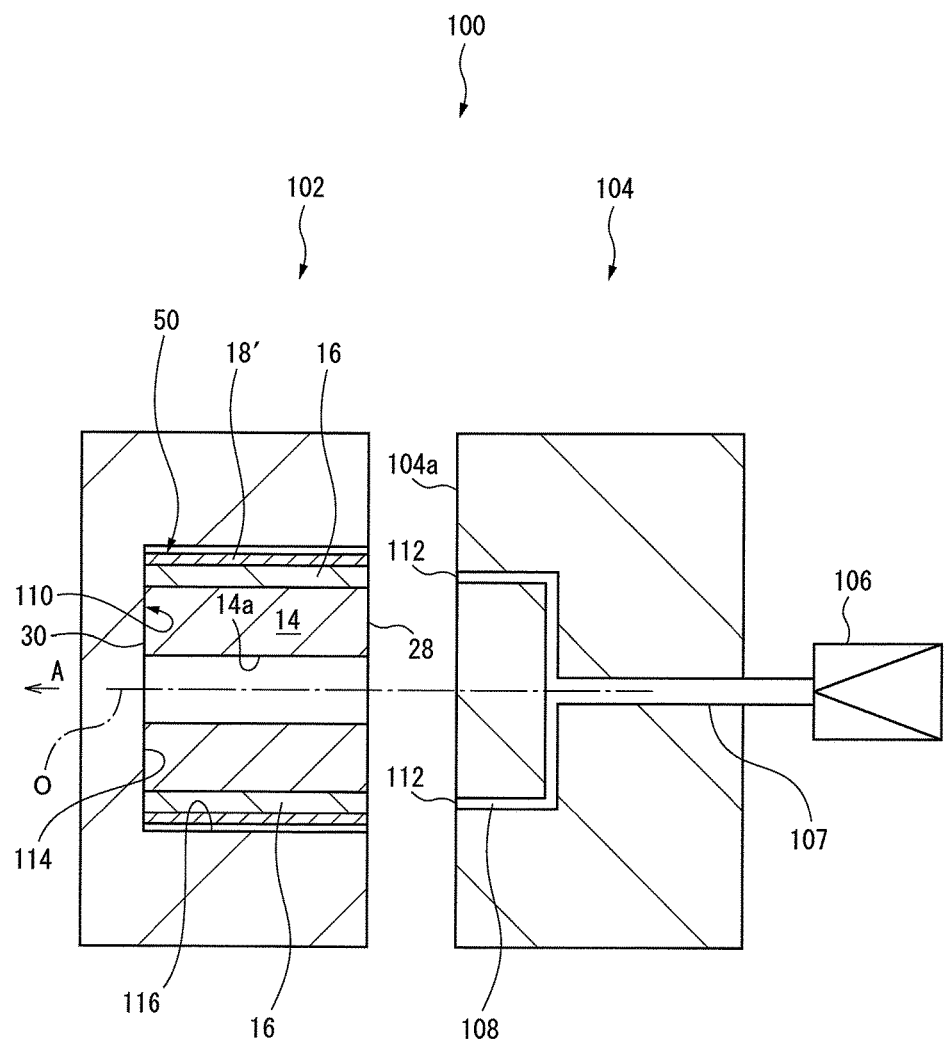
FIG. 6 shows a state at the end of step S4 in FIG. 4.

At this step S4, the manufacturer sets the assembly 50 manufactured at step S3 in the cavity 110 of the first mold 102 so as to be concentric with the cavity 110. This state is shown in FIG. 6. In the state shown in FIG. 6, the axially forward end face 30 of the rotor core 14 contacts a bottom face 114 which defines the cavity 110.

At step S5, the injection molding machine 100 moves the second mold 104 toward the first mold 102 so as to close the cavity 110 of the first mold 102 by the pressurizing face 104a of the second mold 104 (this operation is so-called "mold clamping").

Figure 7:
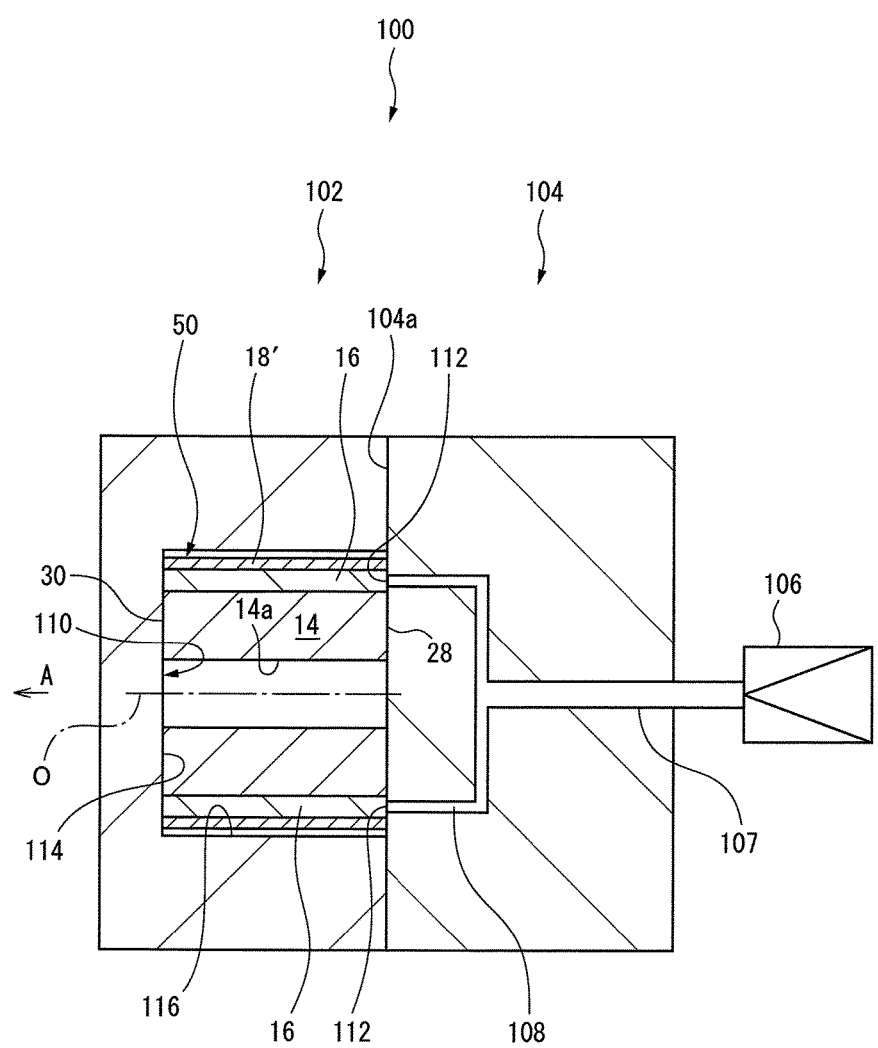
FIG. 7 shows a state at the end of step S5 in FIG. 4.

This state is shown in FIG. 7. In the state shown in FIG. 7, the axially rearward end face 28 of the rotor core 14 is in surface-contact with the pressurizing face 104a. Further, the cover tube 18' is separate radially inward from a side face 116 which defines the cavity 110.

Figure 8:
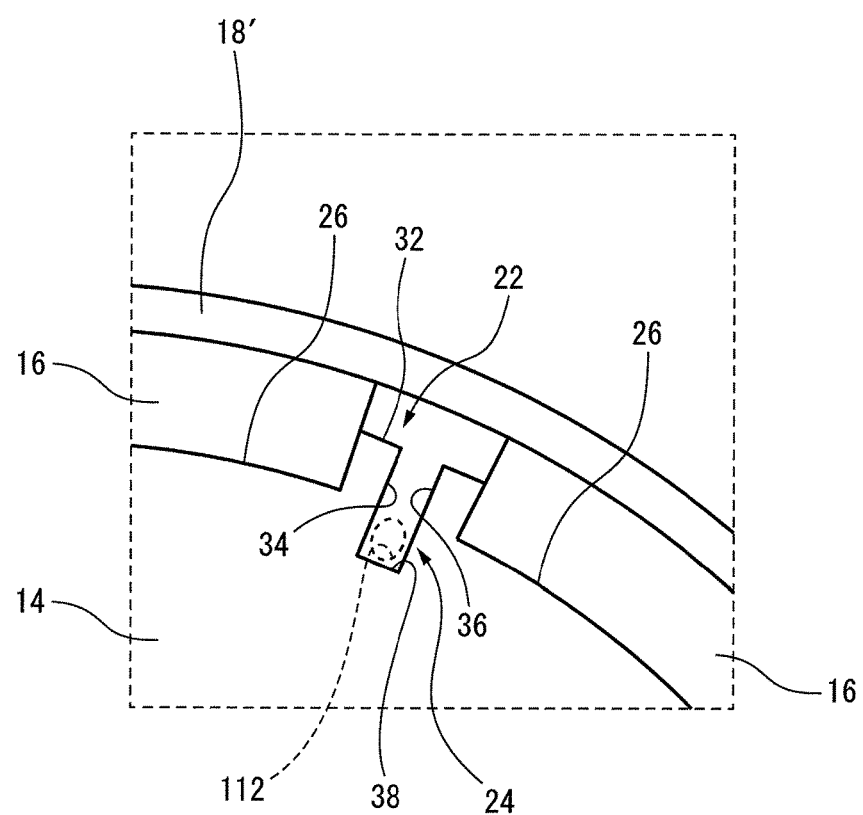
FIG. 8 shows a positional relationship between a cutout and a gate in the circumferential direction, in the state shown in FIG. 7.

Further, the gates 112 are arranged so as to respectively face the cutouts 24 formed at the rotor core 14. FIG. 8 schematically shows the circumferential-positional relationship between one cutout 24 and one gate 112 in the state shown in FIG. 7.

As shown in FIG. 8, at the end of step S5, the gates 112 are positioned with respect to the cutouts 24 so as to face and open to the respective cutouts 24. In this embodiment, each gate 112 is arranged at a position closer to the bottom face 38 than the radially outside end face 32 of each projection 22.

At step S6, the injection molding machine 100 injects the filler (for example, a resin) into the cutouts 24. Specifically, the injection molding machine 100 drives the filler supply unit 106 so as to supply the filler into the hot runner 108 to inject the filler into the cutouts 24 from the gates 112.

The filler injected into the cutouts 24 flows through the cutouts 24, and enters the gap between the cover tube 18' and the rotor core 14. Due to the pressure of the injected filler, the cover tube 18' expands radially outward so as to contact the side face 116 of the cavity 110. As a result, the above-mentioned cover tube 18 is formed.

Further, the filler injected from the gates 112 is filled between each magnet 16 and the cover tube 18, between each projection 22 and the cover tube 18, and inside of each cutout 24. As a result, the above-mentioned filler 20 is formed.

Figure 9:
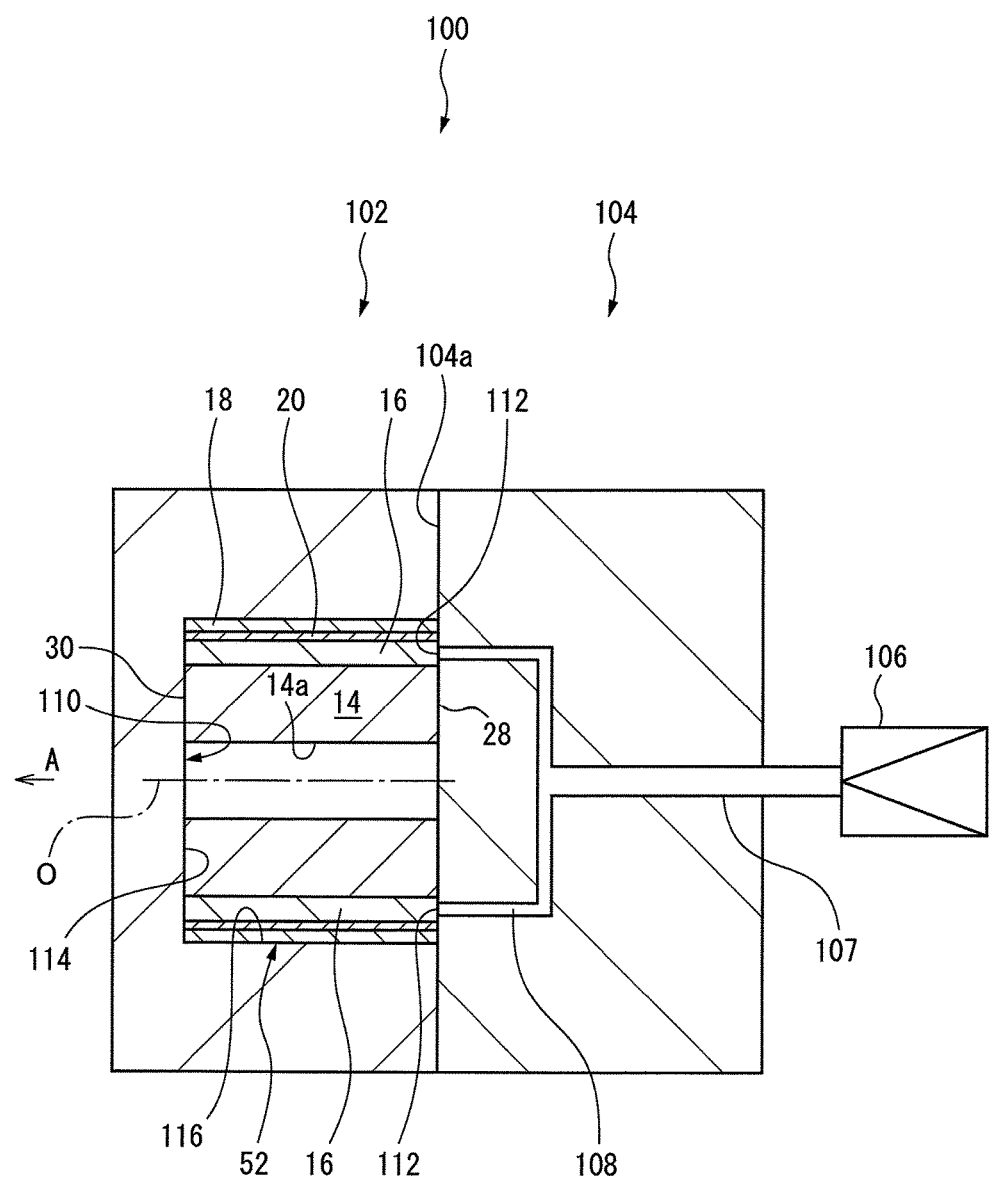
FIG. 9 shows a state at the end of step S6 in FIG. 4.

This state is shown in FIG. 9. By this step S6, an assembly 52 including the rotor core 14, the magnets 16, the cover tube 18, and the filler 20 is manufactured.

At step 7, the manufacturer fixes the rotation shaft 12. Specifically, the manufacturer prepares the rotation shaft 12, and fits it into the through hole 14a of the rotor core 14 of the assembly 52 manufactured at step S6, so as to be fixed there.

For example, the rotation shaft 12 is fixed in the through hole 14a of the rotor core 14 by shrink fitting. By this step S6, the rotor 10 shown in FIG. 1 is manufactured.

As mentioned above, in this embodiment, the rotor core 14 is formed with the cutouts 24 into which the filler is injected at step S6. According to this configuration, the cover tube 18' can be uniformly expanded at step S6.

This effect will be described below. For a comparison, assuming that no cutout 24 is formed. In this case, at step S6, each gate 112 may be arranged at the gap between the radially outside end face 32 of each projection 22 and the inner surface of the cover tube 18'.

In this case, the gates 112 are arranged closer to the cover tube 18', when compared with the arrangement shown in FIG. 8. If the gates 112 are thus arranged closer to the cover tube 18' and the filler is injected, due to the injection pressure of the filler, the cover tube 18' may be deformed more greatly at the area near the gates 112, thereby, the cover tube 18' may be ununiformly deformed.

In contrast, according to this embodiment, by forming the cutouts 24, it is possible to arrange the gates 112 so as to be separate radially inward from the cover tube 18', as shown in FIG. 8.

Due to this, the injection pressure of the filler applied to the cover tube 18' at the area closer to the gates 112 when the filler is injected from the gates 112 at step S6 can be decreased. As a result, it is possible to prevent the cover tube 18' from being deformed ununiformly due to the injection pressure.

In addition, if no cutout 24 is formed, it is necessary to position each gate 112 at the significantly narrow gap between the cover tube 18' and the radially outside end face 32 of each projection part 22, at step S6.

In contrast, according to this embodiment, it is possible to more-easily position the gates 112 with respect to the cutouts 24, each of which has a comparatively larger dimension in the radial direction. Thereby, the efficiency of the process can be improved.

Further, in this embodiment, the cutouts 24 are formed so that the bottom face 38 of each cutout 24 is arranged radially inward than the outer circumferential face 26 of the rotor core 14. According to this configuration, since the gates 112 can be arranged to be more-greatly separate away from the cover tube 18' at step S6, it is possible to more effectively prevent the cover tube 18' from being un-uniformly deformed.

Note that, there may be various variations for the cutout 24. As an example, the side faces 34 and 36 which define the cutout 24 may be constituted by tapered surfaces inclined with respect to the axis O so that the side faces 34 and 36 approach each other as they extend axially frontward from the axially rearward end face 28 of the rotor core 14.

Further, the bottom face 38 which defines the cutout 24 may be constituted by a tapered surface inclined so that the bottom face 38 extend radially outward as it extends the axially frontward from the axially rearward end face 28 of the rotor core 14.

In these variations, the cross-sectional area of the cutout 24 gradually decreases as it extends axially frontward from the axially rearward end face 28 of the rotor core 14. In these variations, since the injection pressure of the filler can be decreased at a position near the axially rearward end face 28 of the rotor core 14 at step S6, and it is possible to prevent the cover tube 18' from being un-uniformly deformed.

Further, the cutouts 24 may be formed so as to extend axially frontward from the axially rearward end face 28 of the rotor core 14 and end at a position axially rearward of the axially front end face 30 of the rotor core 14. Further, the bottom face 38 of the cutout 24 may be an arc-shaped face recessed radially inward, when seen from the axial direction.

Further, the method of producing the rotor according to the invention is also applicable to a method of producing a rotor which does not include the projections 22. An example of such a rotor is shown in FIG. 10.

Figure 10:
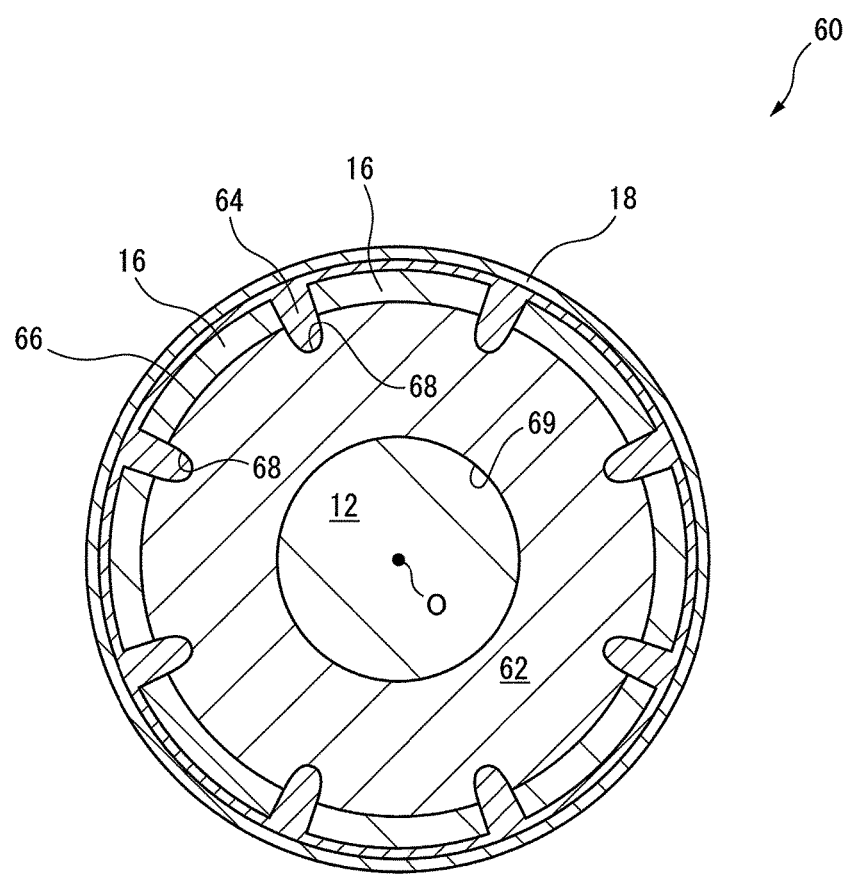
FIG. 10 is a view of a rotor according to another embodiment.

Note that, in the rotor 60 shown in FIG. 10, elements similar to those of the above-mentioned rotor core 10 are assigned the same reference numerals. The rotor 60 includes the rotation shaft 12, a rotor core 62, the plurality of magnets 16, the cover tube 18, and a filler 64.

The rotor core 62 includes a cylindrical outer circumferential face 66, and a plurality of cutouts 68 recessed radially inward from the outer circumferential face 66. Each of the cutouts 68 is arranged between two magnets 16 adjacent to each other in the circumferential direction of the rotor core 62.

Figure 4:
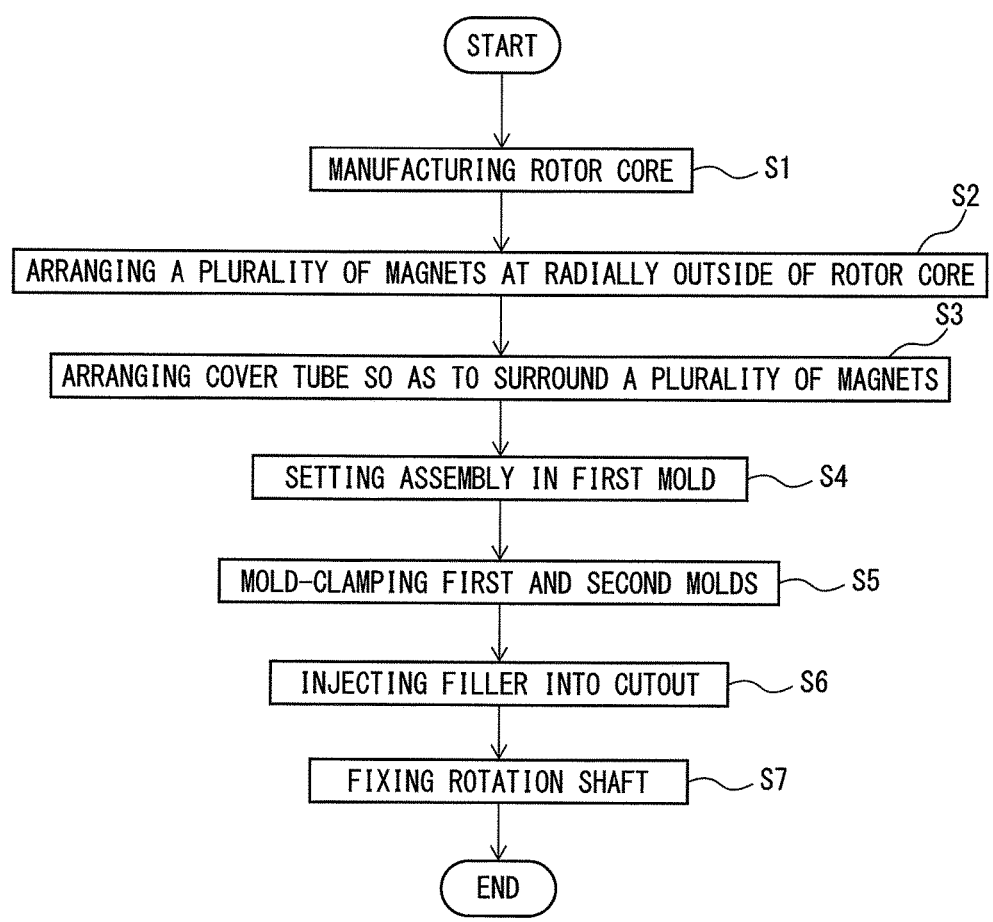
FIG. 4 is a flow chart of a method of producing a rotor, according to an embodiment.

Next, with reference to FIG. 4, a method of producing the rotor 60 shown in FIG. 10 will be described. At step S1, a manufacturer manufactures the rotor core 62 shown in FIG. 10.

At step S2, the manufacturer arranges the plurality of magnets 16 at radially outside of the rotor core 62 so as to align in the circumferential direction at substantially equal intervals. For example, the manufacturer fixes the plurality of magnets 16 to the outer circumferential face 66 of the rotor core 62 by means of an adhesive or the like.

At step S3, the manufacturer arranges the cover tube 18' so as to surround the plurality of magnets 16. Thereby, an assembly including the rotor core 62, the magnets 16, and the cover tube 18' is manufactured.

At step S4, the manufacturer sets the assembly manufactured at step S3 in the cavity 110 of the first mold 102 of the above-mentioned injection molding machine 100 so as to be concentric with the cavity 110.

At step S5, the injection molding machine 100 moves the second mold 104 toward the first mold 102, and closes the cavity 110 of the first mold 102 by the pressurizing face 104a of the second mold 104 (i.e., "mold clamping"). At this time, the gates 112 are arranged so as to face the respective cutouts 68 of the rotor core 62.

At step S6, the injection molding machine 100 injects a filler (for example, a resin) into the cutouts 68. Thus, the cover tube 18' expands radially outward due to the pressure of the injected filler, and thereby, the cover tube 18 and filler 64 shown in FIG. 10 are formed. By this step S6, an assembly including the rotor core 62, the magnets 16, the cover tube 18, and the filler 64 is manufactured.

At step 7, the manufacturer fixes the rotation shaft 12. Specifically, the manufacturer fits the rotation shaft 12 into the through hole 69 of the rotor core 62 of the assembly manufactured at step S6, so as to be fixed there. By this step S6, the rotor 60 shown in FIG. 10 is manufactured.

In this embodiment, by forming the cutouts 68, the gates 112 can be positioned so as to be separate radially inward from the cover tube 18', similarly as the above-mentioned embodiment.

Due to this, the injection pressure applied to the cover tube 18' at an area near the gates 112 when the filler is injected from the gates 112 at step S6 can be decreased, as a result of which, it is possible to prevent the cover tube 18' from being un-uniformly deformed.

Note that, the number of the cutout 24 or 68 may be one or "N" ("N" is an integer greater than one, but less than the number of the magnets 16).

The number of the gate 112 may be one or "M" ("M" is an integer greater than one, but less than the number of the cutouts 24 or 68). In this case, one gate 112 is arranged to face one cutout 24 or 68.

Figure 11:
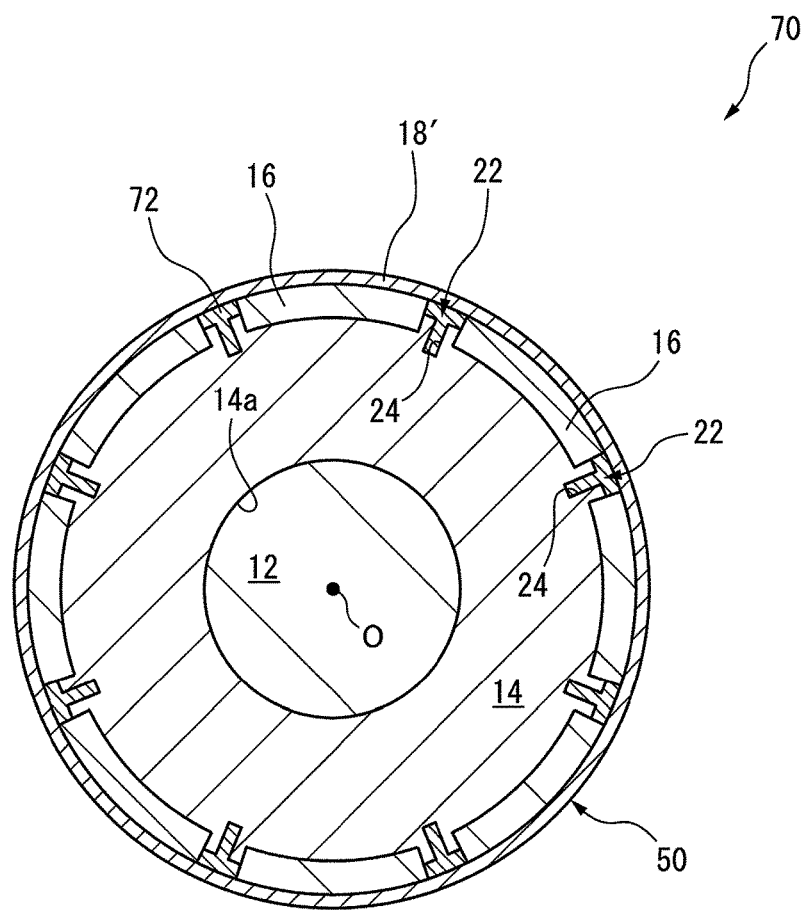
FIG. 11 is a view of a rotor according to still another embodiment.

Further, at step S6, the filler may be filled in a gap between the rotor core 14 and the cover tube 18' without expansion of the cover tube 18'. In this case, the rotor 70 shown in FIG. 11 is manufactured.

The rotor 70 includes the assembly 50, a filler 72 filled in the gap between the cover tube 18' and the rotor core 14 of the assembly 50, and the rotation shaft 12 inserted into the through hole 14a of the rotor core 14 of the assembly 50. In this rotor 70, the outside surfaces of the magnets 16 are in surface-contact with the inner circumferential face of the cover tube 18'.

Further, instead of the above-mentioned steps S2 and S3, the manufacturer may firstly arrange the cover tube 18' so as to surround the rotor core 14, and then may press-fit the plurality of magnets 16 between the outer circumferential face 26 of the rotor core 14 and the cover tube 18' so as to manufacture the assembly 50.

Further, at the above-mentioned step S3, the manufacturer may prepare the cover tube 18 shown in FIG. 1, and then may arrange it so as to surround the magnets 16 fixed on the outer circumferential face 26 of the rotor core 14 from radially outside.

In this case, a gap is formed between the outside surface of the magnets 16 and the inner circumferential face of the cover tube 18. Subsequently, at step S6, the filler 20 may be filled in the gap between the rotor core 14 and the cover tube 18 without expansion of the cover tube 18 so as to manufacture the rotor 10 shown in FIG. 1.

The invention has been described based on the embodiments of the invention, and the foregoing embodiments do not restrict the invention in accordance with the claims. In addition, although embodiments which combine the features currently described in the embodiments of the invention may also be included in the technical scope of the invention, not all of elements and combinations thereof that will be described in the embodiments are essential for means for solving the problems of the invention. Furthermore, it is apparent to those skilled in the art that various changes or modifications can be added to the foregoing embodiments.

It should be noted that in the performance sequence of pieces of processing such as the operations, the procedures, the steps, the processes and the stages in the device, the system, the program, and the method in the claims, the description, and the drawings, as long as "before" or "prior to" is not specifically described, and as long as the output of the preceding processing is not used in the subsequent processing, the pieces of processing can be performed in any sequence. In the operation flow of the claims, the description, and the drawings, for the sake of convenience, it is not always necessary that the pieces of processing be performed in this order even if "first", "then", "subsequently" or the like is used.

The invention claimed is:

1. A method of producing a rotor of an electric motor, comprising:
    providing a rotor core including a cutout formed to be recessed radially inside from an outer circumferential face of the rotor core, the cutout extending in an axial direction from a first end face of the rotor core in one direction of the axial direction toward a second end face of the rotor core in the other direction of the axial direction, the rotor core also having a recess for each of a plurality of magnets, the recess located on an outer circumferential face of the rotor core wherein each recess is flanked by a projection to retain each magnet in its respective recess and the cutout is located between a projection of adjacent recesses;
    arranging the plurality of magnets in their respective recess;
    arranging a cover tube so as to surround the plurality of the magnets;
    arranging a gate of an injection molding machine for injecting a filler so as to face an inner space of the cutout; and
    injecting filler into the inner space of the cutout through the gate by the injection molding machine and filling the cutout and a gap between an exterior surface of the magnets located on the rotor core and an inner circumferential surface of the cover tube with the filler so as to expand the entirety of the inner circumferential surface of the cover tube is separated away from the exterior surfaces of the plurality of magnets due to a pressure of the injected filler.

2. The method according to claim 1, wherein the injection molding machine includes:
    a first mold formed with a cavity; and
    a second mold installed so as to be movable in directions toward and away from the first mold, the second mold having a pressurizing face at which the gate is provided,
    wherein the method comprises:
    setting, in the cavity, an assembly of the rotor core, the plurality of magnets arranged at radially outside of the rotor core, and the cover tube arranged so as to surround the plurality of the magnets, such that the second end face of the rotor core contacts a bottom face of the cavity;
    moving the second mold toward the first mold so as to contact the pressurizing face with the first end face of the rotor core such that the gate is arranged to face the inner space of the cutout, and closing the cavity by the pressurizing face.

3. The method according to claim 1, wherein the filler is a resin.

4. The method according to claim 1, wherein the cutout extends from the first end face toward the second end face and reaches the second end face.

5. A method of producing a rotor of an electric motor, comprising:
    providing a rotor core including a cutout formed to be recessed radially inside from an outer circumferential face of the rotor core, the cutout extending in an axial direction from a first end face of the rotor core in one direction of the axial direction toward a second end face of the rotor core in the other direction of the axial direction;

arranging a plurality of magnets at radially outside of the rotor core so that the cutout is located at a position between two of the magnets adjacent to each other in a circumferential direction of the rotor core;

arranging a cover tube so as to surround the plurality of the magnets;

arranging a gate of an injection molding machine for injecting a filler so as to face an inner space of the cutout; and injecting a filler into the inner space of the cutout through the gate by the injection molding machine and filling a gap between the rotor core and the cover tube with the filler so as to expand the cover tube radially outward due to a pressure of the injected filler, wherein the rotor core includes:

a plurality of projections extending in an axial direction from a first end face of the rotor core in one direction of the axial direction toward a second end face of the rotor core in the other direction of the axial direction; and the cutout formed to be recessed radially inside from a radially outside end face of at least one of the projections;

wherein the gate is arranged at a position closer to a bottom face of the cutout than the radially outside end face of the projection when arranging the gate so as to face the inner space of the cutout.

* * * * *